United States Patent [19]

Jenekhe

[11] Patent Number: 4,963,616
[45] Date of Patent: Oct. 16, 1990

[54] COMPLEXATION-MEDIATED SOLUBILIZATION OF POLYMERS

[75] Inventor: Samson A. Jenekhe, Rochester, N.Y.

[73] Assignee: Honeywell Inc., Minneapolis, Minn.

[21] Appl. No.: 291,924

[22] Filed: Dec. 29, 1988

[51] Int. Cl.$^5$ .............................................. C08L 18/71
[52] U.S. Cl. .................................... 524/600; 252/500; 528/481
[58] Field of Search ........................ 524/600; 252/500; 528/481

[56] References Cited

U.S. PATENT DOCUMENTS 3,600,350   8/1971   Kwolek et al. ........................ 357/28
3,819,587   6/1974   Kwolek et al. ....................... 528/481
4,568,482   2/1986   Jenekhe et al. ...................... 252/500

OTHER PUBLICATIONS

Macromolecules 10, Kwolek, et al., "Synthesis, Anisotropic Solutions and Fibers of Poly(1,4-benzamide)", 1390–1396, 1977.
Molecular Crystals and Liquid Crystals 105, "Synthesis of Highly Conducting Heterocyclic Polycarbazoles by Simultaneous Polymerization and Doping in Liquid Iodine", Jenekhe, et al., pp. 175–189, 1984.
Accounts of Chemical Research 19, "Conducting Polymer Solutions", Jane E. Frommer, pp. 2–9, 1986.
Journal of Polymer Science: Polymer Physics Edition, vol. 14, "The Viscosity of Concentrated Solutions of a Heterocyclic Polymer", p. 1717, 1976.
Journal of Applied Polymer Science, vol. 15, pp. 2035–2047, Arnold, et al., "Unusual Film-Forming Properties of Aromatic Heterocyclic Ladder Polymers," 1971.

*Primary Examiner*—Maurice J. Welsh
*Attorney, Agent, or Firm*—M. B. Atlass; C. G. Mersereau

[57] ABSTRACT

Macromolecules, including rigid chain or ladder polymers are solubilized in aprotic organic solvents by complex formation. The resultant polymer solutions are useful for producing films, coatings, fibers, sheets, and other forms of the macromolecules.

27 Claims, 1 Drawing Sheet $$-Z- + MX_n = \overset{MX_n}{\underset{|}{\pm Z-}}$$

M = METALLIC ELEMENT
X = F, Cl, Br, or I
-Z- = -O-, OXY COMPLEX
    = -S-, THIO COMPLEX
    = =N-, IMINO COMPLEX
    = $-\overset{\overset{O}{\|}}{C}-$, CARBONYL COMPLEX
    = $-\underset{|}{N}-$, AMINO COMPLEX

COMPLEXATION-MEDIATED SOLUBILIZATION OF POLYMERS

The Government has rights in this invention, pursuant to a contract awarded by the Department of the Air Force.

CROSS REFERENCE TO RELATED APPLICATIONS

Reference is made to applications Ser. No. 291,792 entitled "SOLUTION PROCESSING OF RIGID CHAIN AND LADDER POLYMERS" and application Ser. No. 291,815, entitled "ORGANIC SOLVENT SYSTEMS FOR SOLUBILIZING POLYMERS" both filed of even date and assigned to the same assignee as the present application. The inventions of those applications address unique but related subject matter.

BACKGROUND OF THE INVENTION

1. Field of the Invention

The present invention relates generally to the solubilization and processing of organic macromolecules and, more particularly, to the complexation-mediated solubilization of rigid chain and ladder polymers in aprotic organic solvents.

2. Related Art

Numerous rigid chain or ladder polymers have been synthesized in the past few decades and shown to exhibit exceptional high temperature stability, very high mechanical strength, resistance to solvents, and generally excellent environmental stability. Polymeric materials with these properties are of technological interest for diverse applications, including as structural materials in engineering structures and aerospace vehicles, as dielectric materials in electronics, as engine components, and as heat-resistant coatings.

Rigid chain polymers are exemplified by poly(p-phenylene-2,6-benzoxazole) (PBO), of the structure

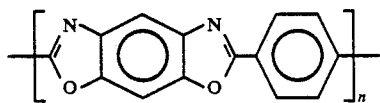

PBO (I)

poly (p-phenylene-2,6-benzothiazole) (PBT), of the structure

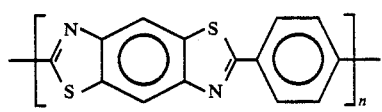

PBT (II)

poly(p-phenylene-2,6-benzimidazole) (PBI), of the structure

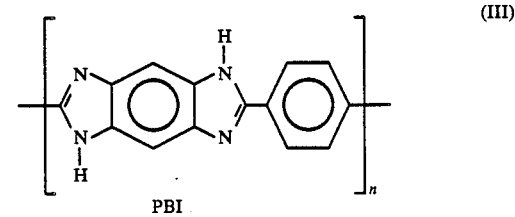

PBI (III)

and the so-called ladder structures, for example, by benzimidazobenzo-phenanthroline-type ladder polymer (BBL) and derivatives, five of whose structures are also shown below.

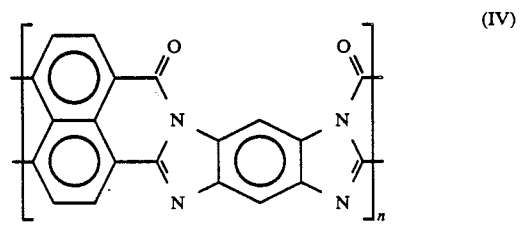

BBL (IV)

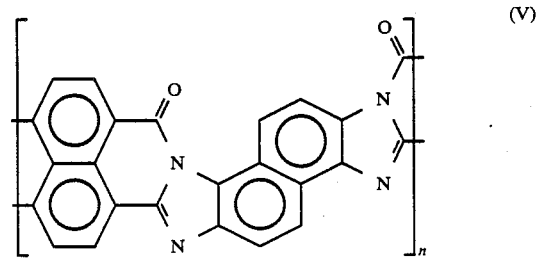

BBL-N (V)

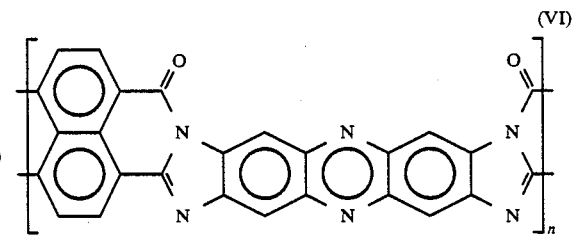

BBL-P (VI)

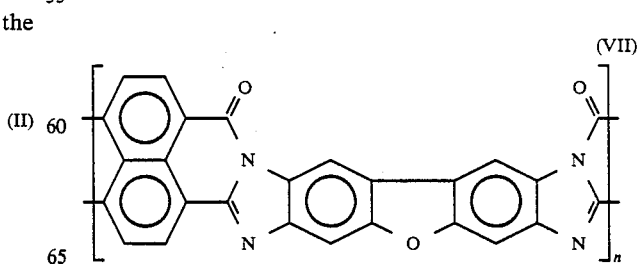

BBL-DBF (VII)

-continued

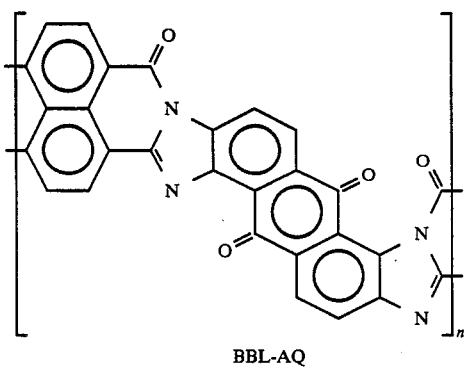

BBL-AQ

Other examples of ladder polymers include the polyhydroquinoxaline ladder structure,

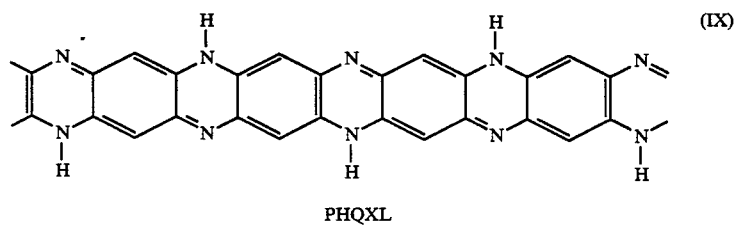

PHQXL whose oligomeric model compound 5,12-dihydro-5,7,12,14-tetraazapentacene (DHTAP) has the structure

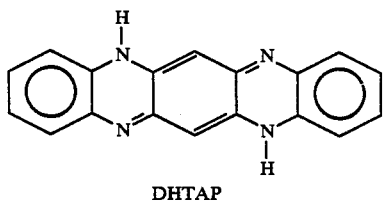

DHTAP

The semi-ladder polybenzimidazobenzophenanthroline (BBB) of structure,

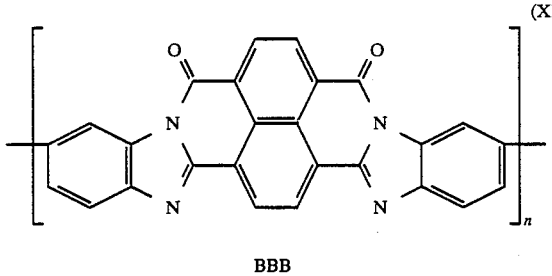

BBB and its oligomeric model compound cis-BB of the structure,

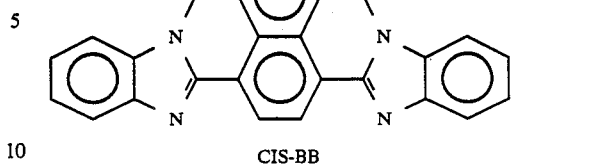

CIS-BB also exemplify the rigid chain and thermally stable polymers in structural and physical properties. Other notable polymers in this regard include the non-fused polybenzimidazole (X=N—H) and derivatives with the structure,

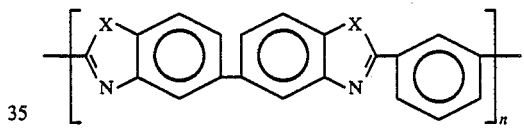

and the aromatic polyimides of the structure

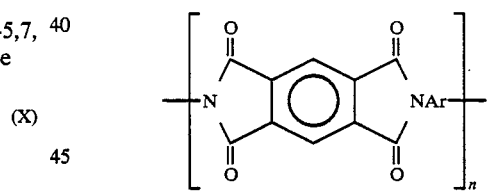

such as poly [N,N'-bis(phenoxyphenyl)pyrromellitimide) or Kapton (Trademark of the duPont Co).

More recently, these rigid chain or ladder polymers, such as exemplified in structures I to XIV, have shown useful electronic and optical properties in addition to their excellent thermal stability and mechanical properties and thus are of further technological interest as novel materials for electronic, electro-optic, and optical applications.

However, these rigid chain and ladder polymers and even those modified with pendant groups, have generally been insoluble in aprotic organic solvents from which their solutions could be processed by standard polymer film, coating or fiber processing techniques. Furthermore, their melting points are generally above their decomposition temperatures which are well in excess of 400°-600° C. The general insolubility of these types of polymers in organic solvents can be attributed to two main factors inherent in their molecular architecture (a) intramolecular or conformational effects, particularly the rigidity of the polymer chains; and (b)

intermolecular effects, especially strong interchain interactions.

Heretofore, strong and corrosive concentrated acids, such as methanesulfonic acid (MSA), triflic acid ($CF_3SO_3H$), and sulfuric acid, are solvents which have been used to characterize their properties and process them into films or fibers. The observed solubility of these polymers in strong protic acids is generally thought to originate from protonation of the polymer chains to form polyelectrolytes, such as shown below for BBL,

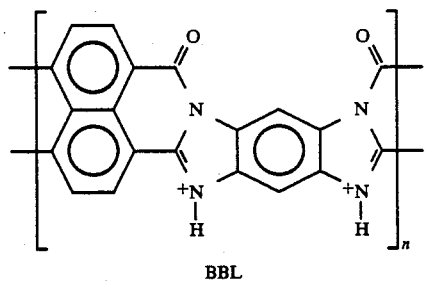

(XV)

BBL with consequent significant reduction of the intermolecular attractions and the rigidity of the chain. The major disadvantages of using these strong acid solutions for large-scale production of films and fibers of these rigid chain and ladder polymers include the highly corrosive and toxic nature of the solvents; in addition, the acids are not volatile and are generally difficult to remove from the polymer films or fibers.

In the related art, processing of rigid chain para-linked aromatic polyamides such as poly(1,4-benzamide) (PBA),

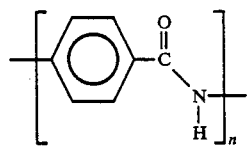

(XVI)

PBA and poly(1,4-phenyleneterephthalamide) (PPTA) or Kevlar (Trademark of the E.I. duPont Co.),

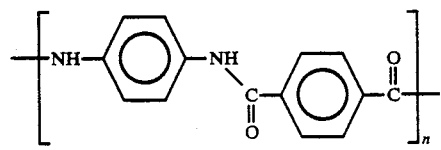

(XVII)

PPTA to fibers and films is achieved by their successful solubilization in a binary solvent system consisting of LiCl or $CaCl_2$ dissolved in amide solvents such as N,N-dimethylformamide (DMF), N,N-dimethylacetamide (DMAc) and N-methylpyrrolidone (NMP).

Typically, PBA, PPTA or related rod-like aromatic polyamides can be dissolved in the aprotic organic solvents (DMF, DMAC, NMP) containing 3-15% wt LiCl or $CaCl_2$. At sufficiently high PBA or PPTA concentrations in LiCl/amide or $CaCl_2$/amide solvents, liquid-crystalline solutions can be obtained. Such liquid-crystalline polymer solutions are used to prepare high-strength, high-modulus oriented fibers as disclosed by S. L Kwolek, et al (U.S. Pat. Nos. 3,600,350 and 3,819,587, and *Macromolecules* 10, 1390–1396, 1977). However, these salt/amide solvent systems, such as LiCl/DMF, LiCl/DMAc, LiCl/NMP, etc. do not solubilize the class of rigid chain thermally stable polymers exemplified by the polymer structures I to XIV.

Some researchers have reported successful solubilization of certain rigid chain, conjugated, or ladder polymers in pure Lewis acids in the molten or liquid state. One of the present inventors, S. A. Jenekhe, and his co-workers have disclosed the successful solubilization of polycarbazoles of the structure,

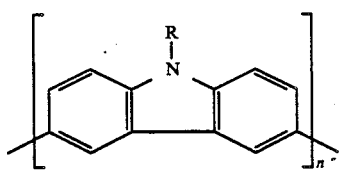

(XVIII)

in molten iodine (m.p.=106° C.), resulting in conducting polymer solutions from which doped conducting films of polycarbazoles can be obtained (Jenekhe et al, U.S. Pat. No. 4,568,482 (of common assignment with the present invention) and *Molecular Crystals and Liquid Crystals* 105, 175, 1984). The solubilization of poly(p-phenylene sulfide) (PPS) of the structure,

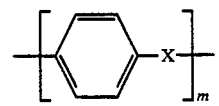

(XIX)

PPS where x=s, in liquid $AsF_3/AsF_5$ to produce conducting solutions from which conducting films of PPS can be obtained has been reported by Frommer (J. E. Frommer, *Accounts of Chemical Research* 19, 2–9, 1986).

The solubilization of a rigid chain polymer, polybisbenzimidazobenzophenathroline-dione (BBB), of the structure XII, in molten antimony trichloride ($SbCl_3$) (m.p.=73° C.) has been reported by Berry et al (G. C. Berry and S. M. Liwak, *J. Polym. Sci.: Polym. Phys. Ed.* 14, 1717, 1976). In studies by the present inventors, some of the rigid chain and ladder polymers of structures I-XIV, and related polymers have been found to dissolve in some liquid or molten pure Lewis acids such as bromine, $SbCl_3$, and $AsF_3$ but do not dissolve in others such as $S_bCl_5$, and $SbF_5$.

Nevertheless, these pure liquid or molten Lewis acids are not practical solvents for potential large-scale processing of the rigid chain thermally stable polymers to films, coatings, or fibers, for obvious technical, environmental, and economic reasons. Thus, the problems of solubilization of rigid chain thermally stable polymers in suitable organic solvents, and consequently, the lack of methods for their ready processing to films, coatings, fibers, and other forms, remain a major obstacle to the commercial uses of these polymers which otherwise have many desired and interesting electronic, optical, thermal stability, and mechanical properties.

SUMMARY OF THE INVENTION

The present invention provides new methods of solubilizing rigid chain or ladder macromolecules in aprotic organic solvents in which they have heretofore been insoluble. The methods of solubilization of the present invention include both in-situ or non-in-situ formation of a complex of the rigid chain or ladder macromolecule to be solubilized.

The first approach consists in the complexing reaction of the pristine polymer with a mediating or complexing agent dissolved in an aprotic organic liquid which is otherwise non-solvent for the pristine polymer, resulting in the in-situ formation of its complex. The second approach consists in the prior preparation of a soluble complex of the rigid chain macromolecule by any suitable complexation reaction, resulting in a form or derivative of the pristine macromolecule which can be subsequently dissolved in common aprotic organic solvents that would otherwise not solubilize the pristine macromolecule.

These methods of mediated solubilization via complex formation have been successfully used to produce solutions of many macromolecules, including rigid chain and ladder polymers Inability to solubilize these important macromolecular compounds in organic solvent media had previously hindered their usefulness. Thus, the solutions produced by the methods of complex formation of the present invention allow processing of the polymers to useful forms such as films, coatings, fibers, rods, or sheets.

In the in-situ approach to mediated complexation-assisted solubilization of this invention, suitable mediating or complexing agents are preferably, but not limited to metal halide Lewis acids. This is in view of the fact that most of the rigid chain and ladder polymers contain electron donor elements (e.g., S, O, N) or pi-electrons which allow complex formation with electron acceptors such as metal halide Lewis acids. The complex formation and solubilization take place in one step:

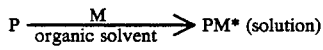

Where P is the solid rigid chain or ladder polymer, M is the mediating agent and PM* is the polymer complex.

In the ex-situ (non-in-situ) approach to complexation-assisted solubilization of this invention, dissolution of the rigid chain macromolecule (P) is accomplished in two different successive steps:

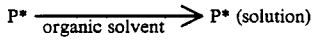

where P* is a complex of the macromolecule. The first step consists in the formation of a solid complex derivative (P*) of the prinstine macromolecule using any suitable complexation reaction. The second step is simply the addition of the solid complex so formed to organic solvents, thereby solubilizing the complex P*.

DETAILED DESCRIPTION OF THE INVENTION

Figures 1, 2:
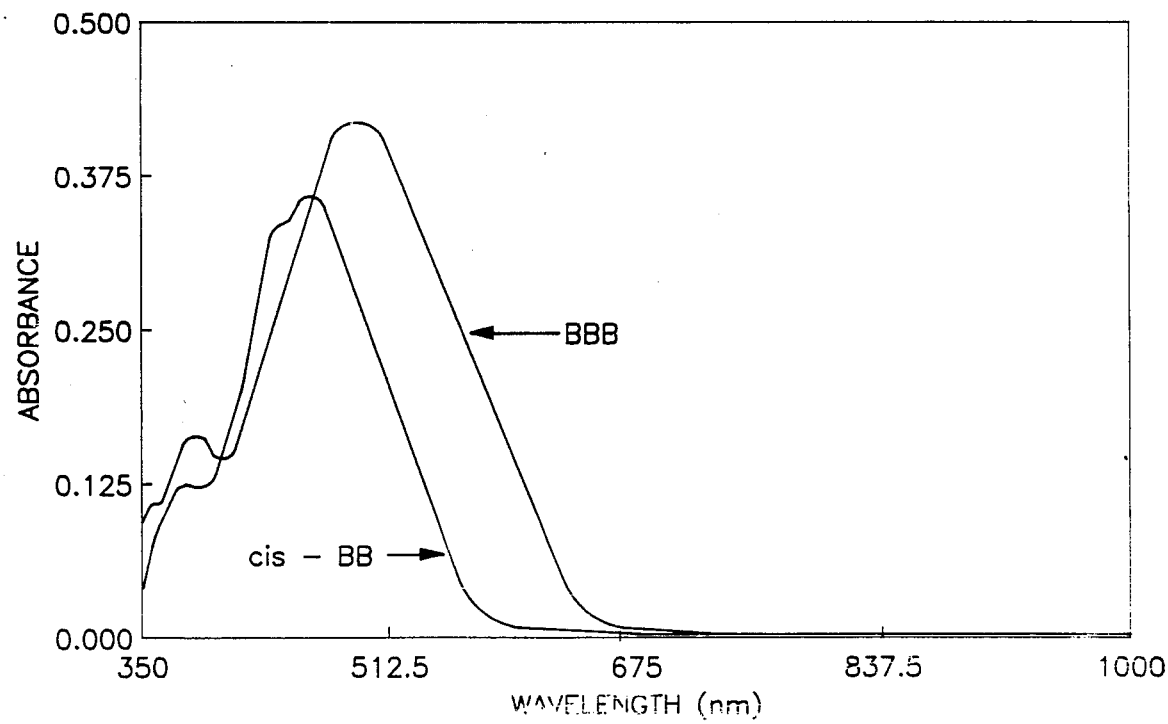
FIG. 1 illustrates electron donor-acceptor (EDA) complexes involved in some aspects of complexation-mediated solubilization of rigid chain macromolecules.
FIG. 2 graphically illustrates solution electronic absorption spectra of macromolecular compounds XI (BBB) and XII (cis-BB) in organic solvents achieved by complexation-mediated solubilization.

This invention arises from our discovery of new methods of solubilizing otherwise insoluble rigid chain macromolecules in aprotic organic solvents. These methods are based on in-situ or non-in-situ formation of complexes of the polymers to be solubilized in aprotic organic solvents. One way of viewing complexation-assisted dissolution of otherwise insoluble rigid chain polymers in an aprotic organic solvent is that complex formation introduces molecules or ions of the complexing agent between chains and adds charge to or distributes charge on the macromolecular chain. The net result of such a process would be reduction of intermolecular attraction between chains and reduction of chain stiffness. Solvent penetration between chains can be expected to be easier in such a polymer complex than in the pristine macromolecule.

Complexation-mediated solubilization via in-situ complex formation is illustrated by the reaction scheme:

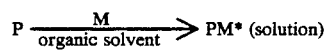

Where P is the pristine rigid macromolecule, PM* is the polymer complex formed in-situ, and M is the mediating or complexing agent.

Preferred complexing agents include Lewis acids. Suitable Lewis acids include compounds $MX_n$, where M is a metal element from the Periodic Table such as Al, B, Ga, Fe, In, Sn, Sb, Ti, Zr, Hf, Nb, Ta, Mo, Ca, W, Pt, Re, Zn, Bi, As, Ir, Mn, Au, Cu, Cr, Wo, V, Yb, Y, Nd, Co, Os, Cd, Cs, Be, or Ge, Rh, Ni, Pd, Tm, Tb, Te, Sc, Dx, Er, Eu, Ge, La, Lu, Sm, Pr, Ru and X is a halide (Cl, F, Br, or I) and n=1, 2, 3, 4, 5, or 6. Thus, suitable Lewis acids include: $FeCl_3$, $SbCl_3$, $AlCl_3$, $SbCl_5$, $AlBr_3$, $AlI_3$, $GaCl_3$, $BCl_3$, $GaBr_3$, $GaI_3$, $GaCl_2$, $FeCl_2$, $InBr_3$, $InI_3$, $SnCl_4$, $TiCl_4$, $TiBr_4$, $ZrCl_4$, $HfCl_4$, $SbF_5$, $AuCl_3$, $ZrBr_4$, $ZrI_4$, $PtCl_4$, $ReCl_3$, $ReCl_5$, $WCl_6$, $MoCl_5$, $MoF_6$, $TaCl_5$, $TaBr_5$, $TaF_5$, $NbF_5$, $NbCl_5$, and $AsF_3$.

Other suitable complexing agents include nitrosyl ($NO^+$) salts, $NO^+A^-$, Where A=$BF_4$, $HSO_4$, $PF_6$, $SbCl_6$, or $AsF_6$, etc.

Suitable aprotic organic solvents include those with a combination of low electron donor properties. A quantitative measure of the electron donor (i.e., nucleophilic) properties of a solvent is the so-called "donor number," DN, which is defined as the molar enthalpy value for the complex formation between the reference electron acceptor $SbCl_5$ and the solvent molecules in dilute solutions of 1, 2-dichloroethane (DCE). A similar independent quantitative measure of electron acceptor (electrophilic) properties is the "acceptor number" AN, which is spectroscopically defined. Suitable neat aprotic organic solvents generally have a donor number not greater than 10 or, in case of solvent mixtures, at least one of the aprotic organic solvents should have a donor number less than or equal to 10. Thus, suitable aprotic organic solvents include the nitroalkanes and nitroarenes, generally having 1-6 carbon atoms such as nitromethane (DN=2.7), nitroethane, 1-nitropropane, 2-nitropropane, and nitrobenzene (DN=4.4), nitroxylenes, 1, 2-dichloroethane (DN=0.0), chlorobenzene, nitrotoluenes, toluene, p-xylene, benzene (DN=0.1), benzoyl chloride (DN=2.3), thionyl chloride (DN=0.4), tetrachloroethylene carbonate (DN=0.8), dichloroethylene carbonate (DN=3.2), benzyl fluoride (DN=2.0), and their mixtures. In addition to a low donor number, a suitable neat aprotic organic solvent or mixture of aprotic organic solvents should exhibit a moderate to high dielectric constant ($\epsilon' > 10$).

The suitable concentrations of the Lewis acid(s) in the aprotic organic solvent(s) needed to prepare effective organic liquids for solubilizing polymers are generally in the range of 0.01 Molar to 8 Molar or from 0.01 Molar up to the limit of solubility (saturated solution). The preferred amount of Lewis acid in the organic liquid is generally from 0.1% (wt) to 60% (wt) or saturated solution.

The true nature of the complex PM* depends on both the nature of the mediating agent and the reaction mechanism. One possible mechanism is the formation of charge-transfer (CT) complex between the pristine polymer repeating unit (P) and a Lewis acid ($MX_n$), $$P + MX_n \longrightarrow P^{y+} (MX_{n+1}^-)_y$$

Where y is the extent of charge transfer or chain ionization. According to this model, the donor-acceptor interaction is not localized to any specific donor site and the polymer complex is ionic; it is a salt ionizable in solution. Once formed, the polymer complex can be dissolved either by solvation of the ionized polymer chain or the counterion.

Another possible mechanism involves complex formation via specific donor sites on the polymer chain such as the heteroatoms O, N, and S, which in the chemical environment of the polymer structures I-XIX, are strong electron donors relative to many metal halide Lewis acids and other mediating agents. The possible electron donor-acceptor (EDA) complexes involving specific donor sites on the rigid macromolecules are shown in FIG. 1. In the case of polymers with carbonyl oxygen, formation of a soluble complex between $MX_n$ and the polymer at the oxygen sites can be expected according to Scheme II, $$\underset{-C-}{\overset{O}{\|}} + MX_n = \underset{-C-}{\overset{+O-\overline{M}X_n}{\|}}$$

The polymer complex of scheme II is analogous to intermediates of Friedel-Crafts acylation reactions. A well known example is $AlCl_3$ catalyzed acylation of benzene with acetyl chloride to produce acetophenone. The product of this reaction is actually $AlCl_3$/acetophenone complex in which $AlCl_3$ is coordinated to oxygen as in scheme II. Such a complex is treated with water, liberating pure ketone and dissolving the aluminum salt. Complexation reactions of metal halide Lewis acids with other donor atoms (S,N) in the polymers would be similar to scheme II as shown in FIG. 1. In cases where two different donor atoms (e.g. O and N) occur in a polymer chain, preferential complexation will occur at the stronger donor atom depending on the chemical environments of the donors, organic solvent medium, and the Lewis acid involved or else both donor sites would be complexed.

Complexation-mediated solubilization of rigid chain macromolecules via non-in-situ complex formation is by necessity a two-step process in which (1) a solid complex of the macromolecule is formed by any convenient reaction and (2) the complex is added to an organic solvent to produce a solution of the macromolecule in its complexed form. This method is illustrated by the following sequential processes:

$$P \xrightarrow{\text{complexation}} P^* \text{ (solid)}$$

$$P^* \xrightarrow[\text{organic solvent}]{} P^* \text{ (solution)}$$

where P* is a complex of the macromolecule. In the case of the rigid chain structure DHTAP, it has been found that its solid complexes are formed by reaction with $H_2SO_4$, $CH_3SO_3H$, or $NO^+A^-$ where $A=BF^4$, $HSO_4$, $PF_6$, $SbCl_6$, etc. The complexers formed are believed to be $(DHTAP)^+(A^-)_2$ or $(DHTAP)^+(A^-)_2$ where the union $A^-$ includes $HSO_4^-$, $CH_3SO_3^-$, and those of the corresponding $NO^+$ salts used. Such solid complexes were subsequently readily dissolved in common organic solvents, including DMF, DMAc, NMP, DMSO, MeOH, and acetic acid. In general the complexation reaction step may be performed with the complexing agent in the liquid or gas phase.

Without further elaboration, it is believed that one skilled in the art can, using the preceding description, utilize the present invention to its fullest extent. The following specific embodiments are, therefore, to be construed as merely illustrative, and not limitative of the remainder of the disclosure in any way whatsoever. The methods of complexation-mediated solubilization of otherwise insoluble rigid chain macromolecules of the present invention and their utilization are thus further illustrated by the following examples:

EXAMPLES 1-10

In examples 1-10 three each of ten different organic liquid systems were prepared from $FeCl_3$ and the following neat aprotic organic solvents: (1) nitromethane (bp=101° C.), (2) nitroethane (bp=114° C.), (3) 1-nitropropane (bp=131° C.), (4) 2-nitropropane (bp =120° C.), (5) nitrobenzene (BP=211° C.), (6) $MeNO_2/EtNO_2$ (50/50), (7) $MeNO_2/PhNO_2$ (50/50), (8) $EtNO_2/PhNO_2$ (50/50), (9) $MeNO_2$/2-nitropropane (50/50), and (10) $EtNO_2$/1-nitropropane (50/50). Three concentrations of $FeCl_3$, 0.05 Molar, 0.1M (1.4% wt), and 0.3M (4.1% wt), in each of the ten neat aprotic organic solvents were prepared in jars at ambient conditions.

Whereas, none of the ten neat aprotic organic liquids would dissolve any of the rigid macromolecules of structures I-XIV, it was found that each of the thirty (30) $FeCl_3$/aprotic organic solvents dissolved at least some of these macromolecules including those of structures IV (BBL), X (DHTAP), XI (BBB), and XII (Cis-BB). The polymer of structure II (PBT) either swelled or was partially soluble. The polymers of structures IX and XIV were notably insoluble in the organic solvents systems of examples 1-10.

EXAMPLES 11-20

Both saturated solutions and 0.5M solutions of InCl$_3$ in the ten neat aprotic organic solvents of examples 1-10 were prepared at ambient conditions. The resulting organic solvent systems constitute examples 11-20 and were found to solubilize DHTAP to give deep blue to blue-green solutions. However, the ladder polymer of structure IX was insoluble in the solvent systems of examples 11-20.

EXAMPLES 21-36

In examples 21-36 aluminum chloride (AlCl$_3$) solutions in the ten neat aprotic organic solvents of examples 1-10 as well as in the following neat aprotic solvents were prepared: (31) 1,2-dichloroethane, (32) benzoyl chloride, (33) thionyl chloride, (34) benzene, (35) toluene, and (36) chlorobenzene. Several concentrations of AlCl$_3$ in these sixteen neat liquids were prepared as in examples 1-10, except that the solutions were prepared in a dry box filled with N$_2$ including 1, 3, 5, 10, 15, 20, 25 and 30% (wt) AlCl$_3$. The resulting solvent systems were found to solubilize many polymers, including the rigid chain macromolecules BBB, BBL, cis-BB, PBT, PBO, polyimides (structure XIV), poly (p-phenylene sulfide) (PPS) (structure XIX), etc. However, AlCl$_3$/p-xylene and AlCl$_3$/1,2-dichloroethane solvent systems only partially dissolved rigid chain macromolecules but the related liquids AlCl$_3$/MeNO$_2$/p-xylene (60/40) and AlCl$_3$/MeNO$_2$/1,2-dicholorethane (60/40) were more effective at solubilizing the polymers.

EXAMPLE 37

A 3.2M AlCl$_3$/MeNO$_2$ solvent was prepared under nitrogen in a dry box. Concentrated polymer solutions were prepared, including 6-9% (wt) BBL and 10% (wt) BBB. The 8-9% (wt) BBL solutions in 3.2M AlCl$_3$/MeNO$_2$ appear to exhibit anisotropic morphology (nematic liquid-crystalline phase) whereas lower concentrations exhibited isotropic morphology. The 10% wt BBB solution in this solvent was isotropic.

EXAMPLE 38-85

In examples 38-85 solvent systems were prepared from SbCl$_3$, SbCl$_5$, and SbF$_5$ and the sixteen neat aprotic organic solvents of examples 21-36 and following the procedures of examples 21-36. The concentration of the Lewis acids was in the range 2-28.9% (wt). The resulting solvent systems at room temperature were found to be effective for dissolving many polymers, including most of the rigid chain macromolecules of structures I to XIV and XIX. However, SbCl$_5$/benzene, SbCl$_5$/toluene, SbCl$_5$/chlorobenzene, and SbCl$_5$/p-xylene solvent systems could not solubilize BBB, PBT, BBL, and aromatic polyimides even at Lewis acid concentrations as high as 25-32% wt. Warming the solvent systems to 60° C. significantly improved the number and amount of polymer solubilized and the dissolution rate.

EXAMPLES 86-185

In examples 86-185 the Lewis acids AlBr$_3$, AlI$_3$, GaCl$_3$, GaBr$_3$, GaI$_3$, TiCl$_4$, SnCl$_4$, MoCl$_6$, TaCl$_5$, and BCl$_3$ were used to prepare organic solvent systems at various concentrations from 1% wt up to saturation or limits of miscibility in the ten neat aprotic organic solvents in examples 1-10. The resulting solvent systems were found to be effective at solubilizing many polymers, including most of the rigid chain macromolecules of structures I to XIV and XIX.

EXAMPLES 186-215

In examples 186-215 solutions of NO$^+$BF$_4^-$, NO$^+$HSO$_4^-$, and NO$^+$PF$_6^-$ respectively in the ten nitrosolvents of examples 1-10 were prepared at room temperature (30° C.) or by warming to (60° C.). The rigid chain macromolecules BBL, BBB, and cis-BB were dissolved in these solvents systems to form red solutions. The solubilization of these rigid chain macromolecules observed in these examples is believed to be due to the in-situ formation of a charge-transfer (CT) complex:

$$P \xrightarrow{NO^+A^-} P^{y+}(A^-)_y$$

where P is the macromolecule and A$^-$=BF$_4^-$, HSO$_4^-$, and PF$_6^-$. Ionization of the macromolecular chains arise from the oxidation potential provided by the reduction of NO$^+$ to NO. The complexes formed in these examples are to be contrasted with those formed with the rigid chain macromolecules react with Lewis acids MX$_n$ as illustrated in FIG. 1.

EXAMPLES 216-217

In examples 216 to 217 solid (crystalline) complexes of DHTAP were prepared by reaction with concentrated sulfuric acid and methansulfonic acid respectively. The solid complexes were golden yellow in color and found to be soluble in many organic solvents including DMF, DMAc, DMSO, NMP, methanol, acetic acid, and acetonitrile—all these solvents do not dissolve the uncomplexed or pristine DHTAP. Furthermore, it should be noted that the complex formation involved in these examples is not in-situ.

EXAMPLES 218-221

Various concentrations of the Lewis acids AlCl$_3$, SbCl$_3$, FeCl$_3$, and InCl$_3$ in nitromethane were prepared. The macromolecular compound DHTAP was found to dissolve in each of these organic liquids to form deep blue solutions.

Properties of Lewis Acid/Organic Solvent Systems

The solvation power of any solvent is a complicated quantity which depends on various factors such as structure, polarity, basicity, acidity, donor number (DN), and acceptor number (AN) of the solvent as well as on similar properties of the substrate to be solubilized. Of the classical solvent parameters such as dipole moment, polarizability, dielectric constant ($\epsilon'$), and solubility parameter ($\delta$), $\delta$ values have been widely used to predict solubility of a given polymer in a given solvent. Unfortunately, the solubility parameter of organic solvents does not correctly predict solubility of rigid chain macromolecules such as in structures I-XIV. Contrary to what might be predicted based on solubility parameter values for organic solvents and the rigid chain polymers, the polymers were insoluble. For example, the calculated solubility parameter of PBT is about 12.8 which predicts that it should be soluble in ethanol or nitromethane as both have a solubility parameter of 12.7. However, PBT is insoluble in both of these solvents. The strong protonic acids such as concentrated sulfuric acid, methanesulfonic acid, and trifluoromethanesulfonic acid which heretofore generally dissolved the rigid chain macromolecules have a very high acceptor number (AN>100) and solubilize via protonation of the rigid chain macromolecules.

The present solvent systems based on aprotic organic solvents containing Lewis acids provide a novel general mechanism of solubilization of rigid chain thermally stable polymers. The solvation properties of an organic solvent, including its donor and acceptor numbers (DN, AN), are radically changed by the addition of Lewis acids. For example, in Table 1 it is seen that the acceptor number of neat 1,2-dichloroethane (DCE) is increased about six-fold to 100 due to the addition of SbCl5.

TABLE 1
Properties of Some Solvents

| Solvent | b.p. (°C.)* | $\epsilon'^*$ | donor number+ (DN) | acceptor number+ (AN) |
|---|---|---|---|---|
| 1. Nitromethane (NM) | 101 | 35.7 | 2.7 | 20.5 |
| 2. Nitroethane (NE) | 114 | 28.06 | — | — |
| 3. 1-Nitropropane (1-NP) | 131 | 23.24 | — | — |
| 4. 2-Nitropropane (2-NP) | 120 | 25.5 | — | — |
| 5. Nitrobenzene (NB) | 211 | 34.82 | 4.4 | 14.8 |
| 6. N,N-Dimethylformamide (DMF) | 153 | 36.7 | 26.6 | 16.0 |
| 7. N,N-Dimethylacetamide (DMAc) | 166 | 37.78 | 27.8 | 13.6 |
| 8. N-methyl-2-pyrrolidone (NMP) | 202 | 32.0 | 27.3 | 13.3 |
| 9. Acetonitrile (MeCN) | 81.6 | 37.5 | 14.1 | 18.9 |
| 10. N,N-Dimethylsulfoxide (DMSO) | 189 | 46.68 | 29.8 | 19.3 |
| 11. Methanol (MeOH) | 65 | 32.63 | 19.1 | 41.5 |
| 12. Acetone | 56 | 21.6 | 17.0 | 12.5 |
| 13. Water | 100 | 78 | 16.4 | 54.8 |
| 14. Acetic acid | 118 | 6.15 | — | 52.9 |
| 15. 1,2-Dichloroethane (DCE) | 83.5 | 10.36 | 0.0 | 16.7 |
| 16. SbCl5/DCE | — | — | — | 100.0 |
| 17. Sulfuric acid | — | — | — | |
| 18. Methanesulfonic acid (MSA) | — | — | — | 126.1 |
| 19. Trifluoroacetic acid | 71.78 | 8.55 | — | 105.3 |
| 20. Trifluoromethanesulfonic acid | 161 | — | — | 131.7 |

*J. A. Riddick and W. B. Bunger, Techniques of Organic Chemistry, vol. 2, Organic Solvents, 3rd ed., Wiley-Interscience, New York, 1970.
+V. Gutmann, The Donor-Acceptor Approach to Molecular Interactions, Plenum Press, New York, 1978.

Thus, by adding metal halide Lewis acids to organic solvents, organic liquids with as powerful the solvation properties as concentrated protonic acids can be obtained without the previously enumerated drawbacks of the latter.

The boiling point (bp) of the present Lewis acid/aprotic organic solvents is practically the same as the value for the neat aprotic organic solvents. This fact is important and advantageous in the application of the solvents for solution processing to films, coatings, and fibers of the relevant polymers solubilized in the solvents.

The amount of polymer solubilized in the aprotic organic solvents containing Lewis acids increase with increasing amounts of the Lewis acids in solution. For example, up to 9% wt of BBL solutions in 3M AlCl3/R-NO2 (MeNO2, EtNO2, etc.) have been prepared. This is about twice the highest possible concentration of the same BBL in methanesulfonic acid solutions that can be prepared.

What is claimed is:

1. A method of enabling solubilization in aprotic organic solvents of organic macromolecular compounds of interest from a class of oligomer and polymer compounds consisting of those characterized by the inability to dissolve in aprotic organic solvents in the pristine state, but the ability to form soluble complexes with electron acceptor mediating species comprising the step of:

Complexing an amount of the compound of interest with an amount of at least one of said mediating species to enable solubilization in the complexed form.

2. A method of enabling solubilization in aprotic organic solvents of organic macromolecular compounds of interest from a class of oligomer and polymer compounds consisting of those characterized by the inability to dissolve in aprotic organic solvents in the pristine state but the ability to form soluble complexes with electron-acceptor mediating agent species comprising the step of:

Adding an amount of the compound of interest to a liquid solvent system which comprises an amount of at least one of said mediating agents and an amount of at least one aprotic organic solvent capable of dissolving the compound of interest in the complexed state.

3. A method of mediated solubilization in organic aprotic solvents of organic macromolecular compounds of interest from a class of oligomers and polymer compounds consisting of these characterized by the inability to dissolve in aprotic organic solvents in the pristine state, but the ability to form soluble complexes with electron acceptor mediating agent species comprising the steps of:

combining an amount of the compound of interest with a compatible electron-acceptor mediating agent to form a solid complex derivative of the pristine compound of interest; and adding an amount of the complexed derivative to an amount of at least one compatible aprotic organic solvent.

4. The method of claim 2 wherein said mediating agent is selected from the class consisting of an amount of at least one Lewis acid of the formula $MX_n$ where M is a metal selected from Fe, Al, In, Sb, Ga, Ti, Sn, Mo, Ta and B, X is a halogen selected from F, Cl, Br and I and n is an integer from 2–6; and wherein said aprotic organic solvent is an amount of one or more aprotic organic solvents selected from the group consisting of nitroalkanes and nitroalkenes having 1-6 carbon atoms, nitrobenzene, 2-nitropropane, 1,2-dichloroethane, benzoyl chloride, thionyl chloride, benzene, toluene, xylenes, and chlorobenzene or a combination thereof.

5. The method of claim 3 wherein said mediating agent is selected from the class consisting of an amount of at least one Lewis acid of the formula $MX_n$ where M is a metal selected from Fe, Al, In, Sb, Ga, Ti, Sn, Mo, Ta and B, X is a halogen selected from F, Cl, Br and I and n is an integer from 2-6; and wherein said aprotic organic solvent is an amount of one or more aprotic organic solvents selected from the group consisting of nitroalkanes and nitroalkenes having 1-6 carbon atoms, nitrobenzene, 2-nitropropane, 1,2-dichloroethane, benzoyl chloride, thionyl chloride, benzene, toluene, xylenes, and chlorobenzene or a combination thereof.

6. The method of claim 2 wherein said mediating agent is selected from the class consisting of an amount of at least one Lewis acid selected from the class consisting of $AlCl_3$, $FeCl_3$, $GaCl_3$, $SbCl_3$, $InCl_3$, $SbCl_5$, $AsF_3$ and $SbF_5$; and wherein said aprotic organic solvent is an amount of one or more aprotic organic solvents selected from the group consisting of nitroalkanes having from 1 to 6 atoms, nitrobenzene, 1,2-dichloroethane, benzene, toluene, xylenes, and chlorobenzene.

7. The method of claim 3 wherein said mediating agent is selected from the class consisting of an amount of at least one Lewis acid selected from the class consisting of $AlCl_3$, $FeCl_3$, $GaCl_3$, $SbCl_3$, $InCl_3$, $SbCl_5$, $AsF_3$ and $SbF_5$; and wherein said aprotic organic solvent is an amount of one or more aprotic organic solvents selected from the group consisting of nitroalkanes having from 1 to 6 atoms, nitrobenzene, 1,2-dichloroethane, benzene, toluene, xylenes, and chlorobenzene.

8. The method of claim 4 wherein said macromolecular compounds of interest rigid rod and rigid ladder polymers selected from the group consisting of:
poly (p-phenylene-2,6-benzoxazole) (PBO), poly (p-phenylene-2,6-benzothiazole) (PBT), poly (p-phenylene-2,6-benzimidazole) (PBI), (BBL), (BBL-N), (BBL-P), (BBL-DBF), (BBL-AQ), (PHQXL), (DHTAP), (BBB), (cis-BB), non-fused polybenzimidazole, aromatic polyimides, (PBA), (PPTA), and (PPS).

9. The method of claim 5 wherein said macromolecular compounds of interest are rigid rod and rigid ladder polymers selected from the group consisting of:
poly (p-phenylene-2,6-benzoxazole) (PBO), poly (p-phenylene-2,6-benzothiazole) (PBT), poly (p-phenylene-2,6-benzimidazole) (PBI), (BBL), (BBL-N), (BBL-P), (BBL-DBF), (BBL-AQ), (PHQXL), (DHTAP), (BBB), (cis-BB), non-fused polybenzimidazole, aromatic polyimides, (PBA), (PPTA), and (PPS).

10. The method of claim 6 wherein said macromolecular compounds of interest are selected from the group including rigid rod and rigid ladder polymers selected from the group consisting of:
poly (p-phenylene-2,6-benzoxazole) (PBO), poly (p-phenylene-2,6-benzothiazole) (PBT), poly (p-phenylene-2,6-benzimidazole) (PBI), (BBL), (BBL-N), (BBL-P), (BBL-DBF), (BBL-AQ), (PHQXL), (DHTAP), (BBB), (cis-BB), non-fused polybenzimidazole, aromatic polyimides, (PBA), (PPTA), and (PPS).

11. The method of claim 7 wherein said macromolecular compounds of interest are selected from the group including rigid rod and rigid ladder polymers selected from the group consisting of:
poly (p-phenylene-2,6-benzoxazole) (PBO), poly (p-phenylene-2,6-benzothiazole) (PBT), poly (p-phenylene-2,6-benzimidazole) (PBI), (BBL), (BBL-N), (BBL-P), (BBL-DBF), (BBL-AQ), (PHQXL), (DHTAP), (BBB), (CIS-BB), non-fused polybenzimidazole, aromatic polyimides, (PBA), (PPTA), and (PPS).

12. A solution of at least one organic macromolecular compound of a recalcitrant class of such compounds consisting of those species characterized by insolubility in aprotic organic solvents in the pristine state and the ability to form soluble complexes with electron acceptor mediating agent complexing species, said solution comprising:
an amount of at least one species of macromolecular compound of said recalcitrant class in the complexed state and
an amount of at least one aprotic organic solvent.

13. The solution of claim 12 wherein said mediating agent is selected from the class consisting of an amount of at least one Lewis acid of the formula $MX_n$ where M is a metal selected from Fe, Al, In, Sb, Ga, Ti, Sn, Mo, Ta and B, X is a halogen selected from F, Cl, Br and I and n is an integer from 2-6; and wherein said aprotic organic solvent is an amount of one or more aprotic organic solvents selected from the group consisting of nitroalkanes and nitroalkenes having 1-6 carbon atoms, nitrobenzene, 2-nitropropane, 1,2-dichloroethane, benzoyl chloride, thionyl chloride, benzene, toluene, xylenes, and chlorobenzene or a combination thereof.

14. The solution of claim 12 wherein said mediating agent is selected from the class consisting of an amount of at least one Lewis acid selected from the class consisting of $AlCl_3$, $FeCl_3$, $GaCl_3$, $SbCl_3$, $InCl_3$, $SbCl_5$, $AsF_3$ and $SbF_5$; and wherein said aprotic organic solvent is an amount of one or more aprotic organic solvents selected from the group consisting of nitroalkanes having from 1 to 6 atoms, nitrobenzene, 1,2-dichloroethane, benzene, toluene, xylenes, and chlorobenzene.

15. The solution of claim 12 wherein said macromolecular compounds of interest rigid rod and rigid ladder polymers selected from the group consisting of:
poly (p-phenylene-2,6-benzoxazole) (PBO), poly (p-phenylene-2,6-benzothiazole) (PBT), poly (p-phenylene-2,6-benzimidazole) (PBI), (BBL), (BBL-N), (BBL-P), (BBL-DBF), (BBL-AQ), (PHQXL), (DHTAP), (BBB), (cis-BB), non-fused polybenzimidazole, aromatic polyimides, (PBA), (PPTA), and (PPS).

16. The solution of claim 12 further comprising an amount of an electron acceptor complexing species.

17. The solution of claim 13 further comprising an amount of an electron acceptor complexing species.

18. The solution of claim 14 further comprising an amount of an electron acceptor complexing species.

19. The solution of claim 15 further comprising an amount of an electron acceptor complexing species.

20. A complex of an organic macromolecular compound selected from a class consisting of polymers characterized by an inability to dissolve in aprotic organic solvents in the pristine state but having electron donor sites on the repeating units of the polymer chain and an electron-acceptor species of the Lewis acid class, said complex represented by the structure

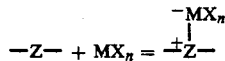

$$-Z- + MX_n = \overset{-MX_n}{\underset{\pm}{Z}}-$$

where
M is a metal element selected from Fe, Al, As, In, Sb, Ga, Ti, Sn, Mo, Ta and B;
X is a halogen selected from F, Cl, BR and I
n is an integer from 2 to 6
Z represents an electron donor site on the polymer chain which occurs at least once in each repeating polymer unit.

21. The complex of claim 20 wherein Z is selected from the group consisting of $-Z- = -O-$, OXY COMPLEX
$= -S-$, THIO COMPLEX
$= =N-$, IMINO COMPLEX

$= -\overset{O}{\underset{\|}{C}}-$, CARBONYL COMPLEX $= -\underset{|}{N}-$, AMINO COMPLEX.

22. The complex of claim 2 wherein said macromolecular compounds of interest are selected from the group including rigid rod and rigid ladder polymers selected from the group consisting of: poly (p-phenylene-2,6-benzoxazole) (PBO), poly (p-phenylene-2,6-benzothiazole) (PBT), poly (p-phenylene-2,6-benzimidazole) (PBI), (BBL), (BBL-N), (BBL-P), (BBL-DBF), (BBL-AQ), (PHQXL), (DHTAP), (BBB), (cis-BB), non-fused polybenzimidazole, aromatic polyimides, (PBA), (PPTA), and (PPS).

23. A complex of an organic macromolecular compound of a class of polymers characterized by the inability to dissolve in the pristine state in organic aprotic solvents but having the ability to form soluble charge-transfer complexes and an electron acceptor species, said complex represented by the structure $$P^{y+}(MX^-_{n+1})_y$$

where
P represents the chain repeating polymer unit;
y represents the extent of charge transfer or; chain ionization;
M is a metal element selected from the Fe, Al, As, In, Sb, Ga, Ti, Sn, Mo, Ta and B;
X is a halogen selected from F, Cl, Br and I; and
n is an integer from 2 to 6.

24. A complex of an organic macromolecular compound of a class of polymers characterized by the inability to dissolve in the pristine state in organic aprotic solvents but having the ability to form soluble charge-transfer complexes and an electron acceptor species, said complex represented by the structure $$P^{y+}(A^-)_y$$

where
P represents the chain repeating polymer unit;
y represents the extent of charge transfer or; chain ionization; and
A is selected from $BF_4$, $HSO_4$, $PF_6$, $SbCl_6$ and $AsF_6$.

25. The complex of claim 24 wherein said electron acceptor species is selected from $NO^+BF_4^-$, $NO^+HSO_4^-$ and $NO^+PF_6^-$.

26. The complex of claim 25 wherein said organic macromolecular compound is selected from BBL, BBB and cis-BB.

27. The method of claim 6 wherein said mediating agent is selected from $AlCl_3$, $SbCl_3$, $FeCl_3$ and $InCl_3$, said aprotic organic solvent is nitiomethane and the compound of interest is DHTAP.

* * * * *